US007711708B2

(12) United States Patent
Bergstraesser et al.

(10) Patent No.: US 7,711,708 B2
(45) Date of Patent: May 4, 2010

(54) VERSIONS AND WORKSPACES IN AN OBJECT REPOSITORY

(75) Inventors: Thomas F. Bergstraesser, Kirkland, WA (US); Philip A. Bernstein, Bellevue, WA (US); Shankar Pal, Redmond, WA (US); David R. Shutt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 10/639,976

(22) Filed: Aug. 13, 2003

(65) Prior Publication Data

US 2005/0262107 A1 Nov. 24, 2005

Related U.S. Application Data

(62) Division of application No. 09/515,037, filed on Mar. 6, 2000, now Pat. No. 6,868,425.

(60) Provisional application No. 60/122,939, filed on Mar. 5, 1999.

(51) Int. Cl.
*G06F 7/00* (2006.01)
(52) U.S. Cl. .................... 707/638; 717/170; 715/229
(58) Field of Classification Search .............. 717/108, 717/170; 707/103, 203, 103 R; 715/736, 715/229; 719/328
See application file for complete search history.

(56) References Cited

U.S. PATENT DOCUMENTS 4,853,843 A * 8/1989 Ecklund .................. 707/203

| 5,499,365 | A | * | 3/1996 | Anderson et al. | ............ 707/203 |
| 5,551,028 | A | * | 8/1996 | Voll et al. | ............ 707/103 R |
| 5,857,207 | A | * | 1/1999 | Lo et al. | ............ 707/203 |
| 5,905,987 | A | | 5/1999 | Shutt et al. | ............ 707/103 R |
| 6,181,336 | B1 | * | 1/2001 | Chiu et al. | ............ 715/736 |
| 6,457,065 | B1 | * | 9/2002 | Rich et al. | ............ 719/328 |

OTHER PUBLICATIONS

Delisle et al., ACM, pp. 132-143, 1986.*
Bernstein, P., ACM Sigmod Record, vol. 27, No. 1, pp. 88-96, Mar. 1998.*

(Continued)

*Primary Examiner*—Cheyne D Ly
(74) *Attorney, Agent, or Firm*—Woodcock Washburn LLP

(57) ABSTRACT

Maintaining versions and workspaces in an object repository is disclosed. The system provides an efficient way to manage versions of objects by only copying objects when absolutely necessary, i.e. when a property value in a particular object has changed. In addition, the system provides a mechanism to control whether or not relationships are propagated to successor versions of an object. A further aspect of the system is that resolution of objects during a relationship traversal can be customized depending on whether or not an application accessing the objects is version-aware. If the application is not version aware, a means for resolving the relationship to a particular object is provided. A still further aspect of the system is that merge behavior is parameterized. When two versions of an object are merged, flags control how conflicts in property values and relationship contents are managed. Finally, the system provides a workspace that acts as a virtual repository session and provides workspace context and scope to repository objects.

4 Claims, 9 Drawing Sheets

OTHER PUBLICATIONS

Chou et al., Very Large Data Bases, Proceedings of the 12th International Conference on Very Large Data Bases, pp. 336-344, 1996.*

Chou, H. et al., "A Unifying Framework for Version Control in a CAD Environment", *Microelectronics and Computer Technology Corporation*, Aug. 1986, 336-334.

Katz, R.H., "Toward a Unified Framework for Version Modeling in Engineering Databases", *ACM Computer Surveys-Computer Science Division*, Electrical Engineering and Computer Science Department, University of California, Berkeley, Berkeley, California 94720, Dec. 1990, 22(4), 375-408.

* cited by examiner

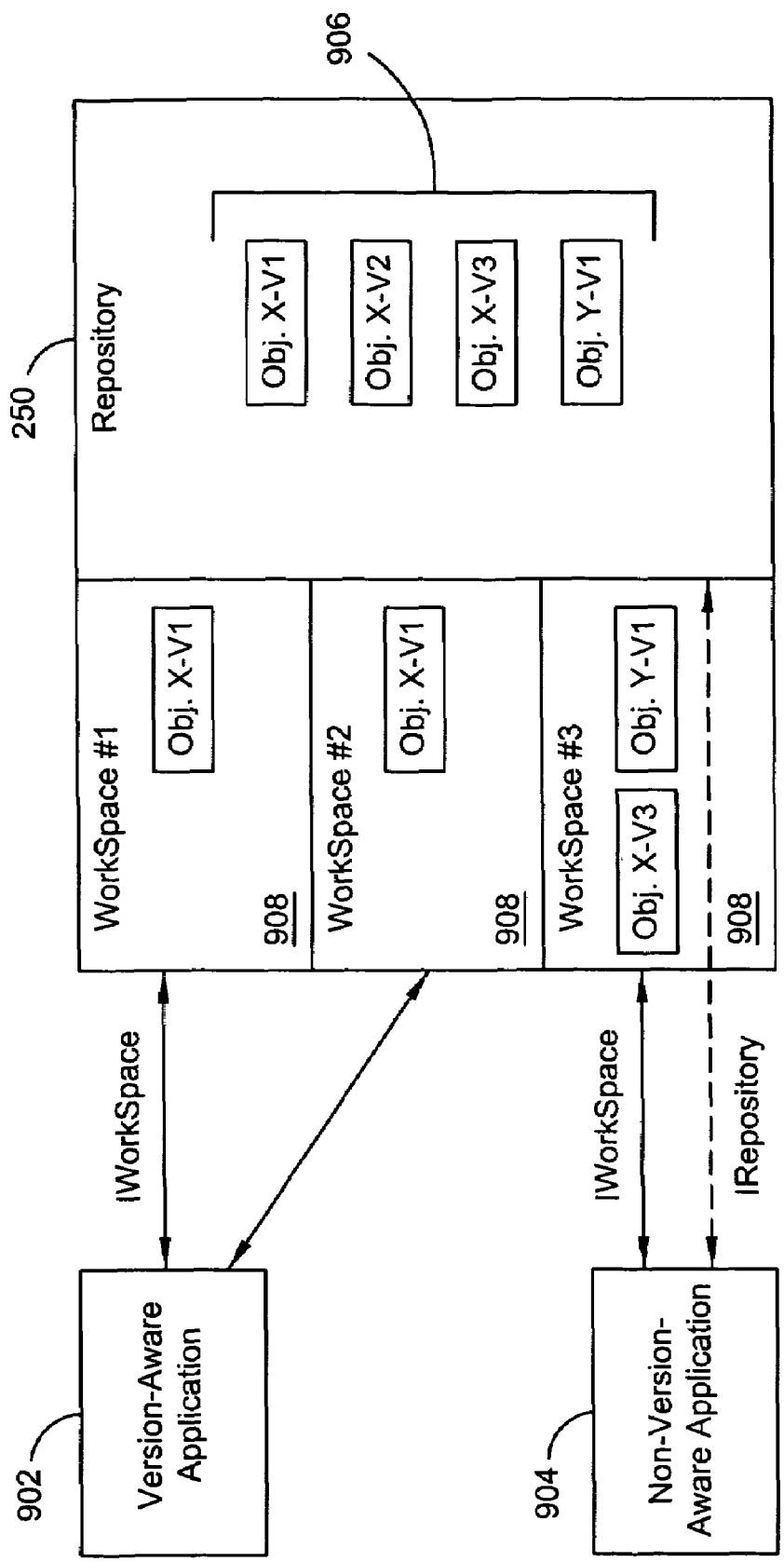

VERSIONS AND WORKSPACES IN AN OBJECT REPOSITORY

RELATED FILES

This application is a divisional of U.S. patent application Ser. No. 09/515,037, filed Mar. 6, 2000, now U.S. Pat. No. 6,868,425, which application claims benefit of U.S. Provisional Application No. 60/122,939, filed Mar. 5, 1999. The above-referenced, related applications are incorporated herein by reference.

FIELD OF THE INVENTION

This invention relates generally to object repositories, and more particularly to maintaining versions and workspaces in an object repository.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1999, 2000, Microsoft Corporation, All Rights Reserved.

BACKGROUND

The number of applications that use object-oriented techniques and languages continues to increase at a rapid pace. This growth in object-oriented applications has resulted in a corresponding growth in the use of object databases and repositories. Object databases and repositories provide for the persistent storage of object data in the same way that a conventional database provides for the storage of tables containing data. Object repositories and object-oriented databases are similar in that they both store data in an object format, however repositories in addition typically provide for the storage of metadata, that is, data about the object data, along with the object data. This metadata typically comprises information such as object formats and interfaces, object versions, check-in/check-out dates and personnel, database schemas, etc.

An object, as is known in the art, is a data structure that has a persistent state. The persistent state consists of attributes, which comprise scalar values and object references. A scalar value is a value such as a string, integer or boolean. An object reference specifies one side of a binary relationship between two objects that refer to each other. In other words, the reference is to another object, which in turn refers back to the referring object. Each attribute is identified by a name, and each attribute has a data type. The data type for an attribute identifies either the type of scalar value for the attribute or the type of relationship defined by the attribute.

In addition to attributes, the state of an object includes structures. A structure contains a group of attributes that are organized according to a particular data structure. This data structure can be a collection (also referred to as a set), sequence, array, table, or record structure. Each structure conforms to a named structure type, which defines the particular data structure (collection, sequence, array, etc.) and the types of attributes the structure can contain. Like any attribute, an attribute in a structure can be a scalar value or object reference. A structure that contains object references is called an object structure.

Each object conforms to one or more types, where each type is identified by a name. An object type defines a set of attribute types and/or structure types that an object of the given type can contain.

An object is typically an instance of a class. A class is a body of code that implements one or more object types. The class includes code to produce new objects of each type that it implements and code to perform various operations on objects of types that it implements and on attributes and structures of such objects. The types of operations performed vary depending on the class, and generally include read and write operations for the attributes and structures of an object.

The life cycle of a software development project typically includes multiple design changes, both before and after release of the software. These design changes include changes in the definition and relationships between objects. As a result it is desirable for object oriented environments to provide the ability to version objects and relationships between objects in the repository.

Previous systems have provided rudimentary versioning capability. In these systems, when a new version of an object is created, a copy of the old version is made, and changes are applied to the copy, which becomes the new version. While this mechanism does provide versioning ability, it has significant disadvantages. First, copying objects is very inefficient in terms of both time and computer resources. Each copy consumes memory, which can be costly given that a typical project will have many different objects, with each object having multiple versions.

A second drawback relates to the versioning interface. It is generally the case that multiple software applications will require access to an object repository. These applications may or may not be "version-aware." In other words, some applications may recognize that various versions of objects exist in the repository, and have interfaces designed to work with the various versions. These applications are known as version-aware applications. Other applications may be designed assuming that: one, and only one version of an object exists. These applications are therefore not version-aware. Object repositories implemented by previous systems either provide a version-aware interface or an interface that is not a version-aware interface, but not both.

A third drawback relates to management of relationships between versions of objects. Previous systems apply an all or none approach to relationships between versions of objects. In other words, either all of the relationships from a previous version are included in the new version, or none of the relationships are included. This is undesirable, because it results in the need for a manual fixup of the relationships whenever a new version is created.

Therefore, there is a need in the art for a system to provide efficient versioning for objects in a repository. The system should only copy object properties and relationships when necessary. Furthermore, the system should provide a mechanism to control whether or not relationships are copied when a new version is created. In addition, the system should provide interfaces to applications that are version-aware, and those that are not version-aware.

SUMMARY

The above-mentioned shortcomings, disadvantages and problems are addressed by the present invention, which will be understood by reading and studying the following specification.

The systems and methods presented maintain versions and workspaces in an object repository. One aspect of the system is that objects and properties are only copied when absolutely necessary, i.e. when a property value in a particular object has changed. In lieu of copying objects, a property table maintains a range of versions for which the property value is the same.

A further aspect of the system is that the propagation of relationships to a new version is controlled by the data model. A flag on the relationship is used to determine whether or not the particular relationship should be copied.

A still further aspect of the system is that resolution of objects during a relationship traversal can be customized depending on whether or not an application accessing the objects is version-aware. If the application is version aware, the traversal resolves to a collection of objects versions related to the origin object. If the application is not version aware, a means for resolving the relationship to a particular object is provided.

A still further aspect of the system is that merge behavior is parameterized. When two versions of an object are merged, flags control how conflicts in property values and relationship contents are managed.

Finally, the system provides a workspace that acts as a virtual repository session and provides workspace context and scope to repository objects.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 9 is a system level overview of an exemplary system according to an embodiment of the invention that provides workspaces in an object repository.

DETAILED DESCRIPTION OF THE INVENTION

Figure 1:
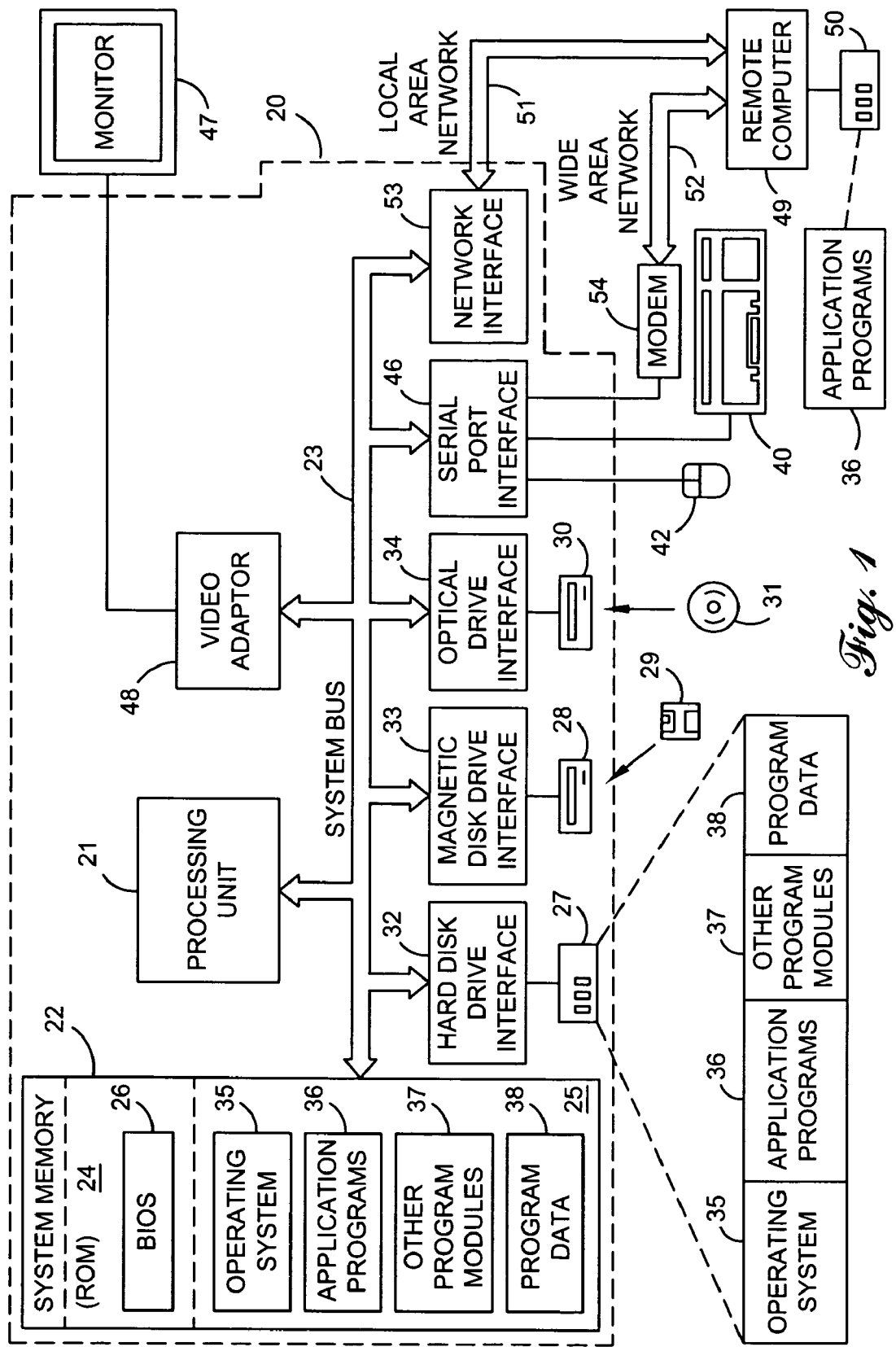
FIG. 1 shows a diagram of the hardware and operating environment in conjunction with which embodiments of the invention may be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense.

The detailed description is divided into multiple sections. In the first section, the hardware and the operating environment in conjunction with which embodiments of the invention may be practiced are described. In the second section, a system level overview of an embodiment of the invention is presented. In the third section, systems, methods and data structures according to embodiments of the invention are described that support versioning of objects in a repository. In the fourth section, system and methods of various embodiments of the invention that provide workspaces in a repository are presented. The fifth section is a conclusion of the specification.

DEFINITIONS

Throughout this application, reference will be made to objects that are created or instantiated by computer software. Such objects will have a data portion associated therewith for storing information, and have methods or functionality associated therewith to provide desired functionality to a client accessing the object. Typically, the methods of the object will be directed in part to manipulating the object's data. Such an abstract object has an associated state that is the cumulative effect of methods operating on the data. It is this state that will be stored by the innovative object state repository as explained in this application.

As used herein, the term "objects," refers to software objects pertaining to a binary object model and that have binary extensibility through wrapping. Furthermore, such objects are interface-based meaning that an object can be used or operated through specific "interfaces" as defined hereafter and an interface-based binary object model will entail objects having multiple interfaces. In this sense, an object is exposed through its interface.

An object may be active or loaded meaning that it is a functional part of a software program or system. An object is said to be persisted when the data portion or properties are stored, though it is more accurate to refer to the state of an object as being persisted. At a later time, an object of the same class may be instantiated and restored to the same state as the original object using the previously persisted object state.

One implementation of a binary object model and system that follows the characteristics of objects used throughout this application and as described above is the Component Object Model or COM as provided by Microsoft Corporation as part of their Object Linking and Embedding (OLE) and ActiveX™ software technology. Reference to COM objects will be made as part of a specific and exemplary embodiment of the present invention. The invention, however, would fit any object model having the relevant characteristics of COM, namely, being an interface-based, binary object model supporting binary extensibility. As an example, the systems and methods detailed below and their equivalents could be adapted for use in a CORBA (Common Object Request Broker Architecture) environment.

As used herein, the term "interface" refers to a specification for a particular and related subgroup of behavior and properties. Behavior or methods are typically a set of software subroutines, with each subroutine having a signature made up of the passed subroutine arguments, their order, and their data type. Further, each interface will have data associated therewith in the form of properties that are only accessible through a subroutine of the interface. Finally, an object may support multiple interfaces to thereby allow an object's characteristics to be defined by the interfaces that it supports and allow many classes to share behavior by supporting some of the same interfaces.

An interface, as part of the binary object system, also specifies a binary convention for accessing the software subroutines that support or implement the interface. Knowing the binary convention, the subroutine signatures that are defined by the interface, and a functional specification of how the subroutines are to behave, an object implementing a particular interface may be created using virtually any source code. Each such independently created object would be wholly unique and may represent internal data in a variety of different structures but from a binary standpoint would appear the same to an invoking client. Likewise, once an interface has been implemented and reduced to its binary form, any client may access the methods through the binary convention.

As used herein, the term "class" refers to a definition for directing a CPU to create an instance of an object. A class, therefore, will implement the interfaces that make up a given object and therefore is a template for creating objects. A class may be a source code definition that is compiled into executable code that will create run-time storage for the properties of an object and executable code to support the interface methods.

As used herein, the term "property" refers to a piece of data associated with an object. Further, the property may only be accessed through the appropriate interface method (e.g., subroutine). For example, a "get" property subroutine and "put" property subroutine are implemented for retrieving and storing values for a particular property, respectively.

As used herein, the term "collection" refers to a special variant for a kind of property. More specifically, it is a set-valued property meaning that multiple items are formed into a collection. An item includes, but is not limited to, scalar values, such as integers, strings, etc., or may be an object (e.g., a handle to an interface of an object). Each collection will support methods for adding or removing an item as well as finding a particular item within the set and returning a count of how many items are in a set.

Hardware and Operating Environment

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIG. 2. The concepts of the invention are described as operating in a multiprocessing, multithreaded virtual memory operating environment on a computer, such as computer 20 in FIG. 1. The exemplary operating environment comprises what is known in the art as a three-tier system. In this environment client application 205 interfaces with a data storage system 250, which interfaces with a physical storage system 270.

In one exemplary embodiment of the invention, data storage system 250 is an object-oriented database providing persistent storage of objects of various types and classes. The system provides interfaces to a variety of services that perform various operations such as reading objects from a persistent storage medium, writing objects to the medium, and maintaining indexes for objects in the database.

In an alternative exemplary embodiment of the invention, data storage system 250 is a repository-based system such as Microsoft Repository, available from Microsoft Corporation. In this embodiment, the repository provides much of the same capability as the object-oriented database described above, and in addition adds a layer to manage metadata that describes objects that may reside inside or outside the repository. The metadata includes information such as data types of attributes, descriptions of object types, and descriptions of data structures, such as collections.

The invention is not limited to object-oriented databases and repositories, and in further alternative embodiments, data storage system 250 can be based on an entity-relationship model, a semantic data model, and a network data model, all of which are known in the art.

While the data storage system 250 has been described in terms of object databases, the underlying physical storage system 270 supporting the object database may be a different type of database. For example, in one embodiment of the invention, a repository database uses as its physical storage system 270 a conventional relational database having tables, and wherein the tables have rows and columns describing and defining the object data. In an alternative embodiment of the invention, physical storage system 270 is a mass storage device such as a disk.

Application 205 is an application that manipulates objects stored in data storage system 250. In one embodiment of the invention, application 205 is an object-oriented application operating as a client, and data storage system 250 is a server. Application 205 communicates and interfaces with data storage system 250 using software routines defined in client data storage library 215.

Figure 3:
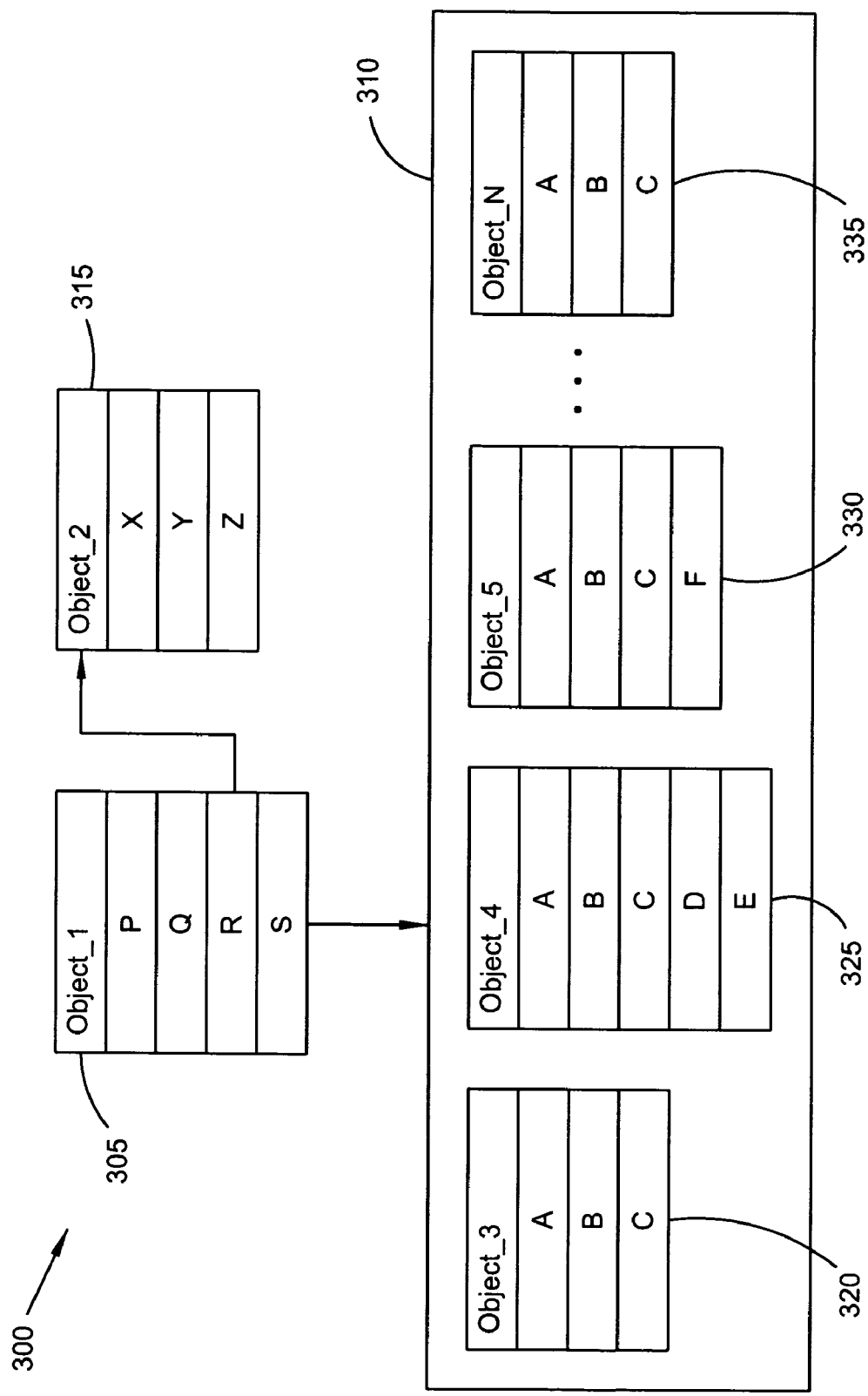
FIG. 3 is an exemplary object hierarchy demonstrating various object and attribute relationships operated on by an exemplary embodiment of the invention.

In FIG. 3, an exemplary object hierarchy 300 is presented. The object hierarchy 300 includes a base object 305, a related object 315, and an object structure 310 containing a set of objects 320, 325, 330 and 335. Each of the objects 305, 315, 320, 325, 330 and 335 has a particular set of attributes determined by the object's type, with base object 305 having attributes P, Q, R and S. Attribute R of base object 305 specifies a relationship to related object 315, and attribute S of base object 305 specifies a relationship to object set 310. The object hierarchy 300 is presented to illustrate how the components and methods of various embodiments of the invention interact, however the invention is not limited to any particular object hierarchy or relationship structure. In particular, the relationship structure need not be hierarchical but rather may include network structures with multiple paths between objects or cyclic paths from an object back to itself. Those skilled in the art will appreciate that variations in the attributes and relationships are possible and within the scope of the invention.

Typically the objects maintained by the data storage system 250, such as objects 305, 315, 320, 325, 330 and 335, have an object identifier associated with them. The object identifier uniquely identifies the object. Several types of identifiers are possible. For example, in one embodiment of the invention, the identifier is a globally unique identifier. This type of identifier can be used to reference an object anywhere in a distributed computer system, including systems such as the three-tier environment shown in FIG. 2. In an alternative embodiment of the invention, a locally unique identifier is associated with each object. This type of identifier can be used to reference objects in a particular database or data storage system. The identifier is guaranteed to be unique only within the particular database. In yet another alternative embodiment, each object has an identifier comprising an execution-specific pointer that references the object. The pointer is unique to the program while it is running, and cannot be used after the program terminates.

Figure 2:
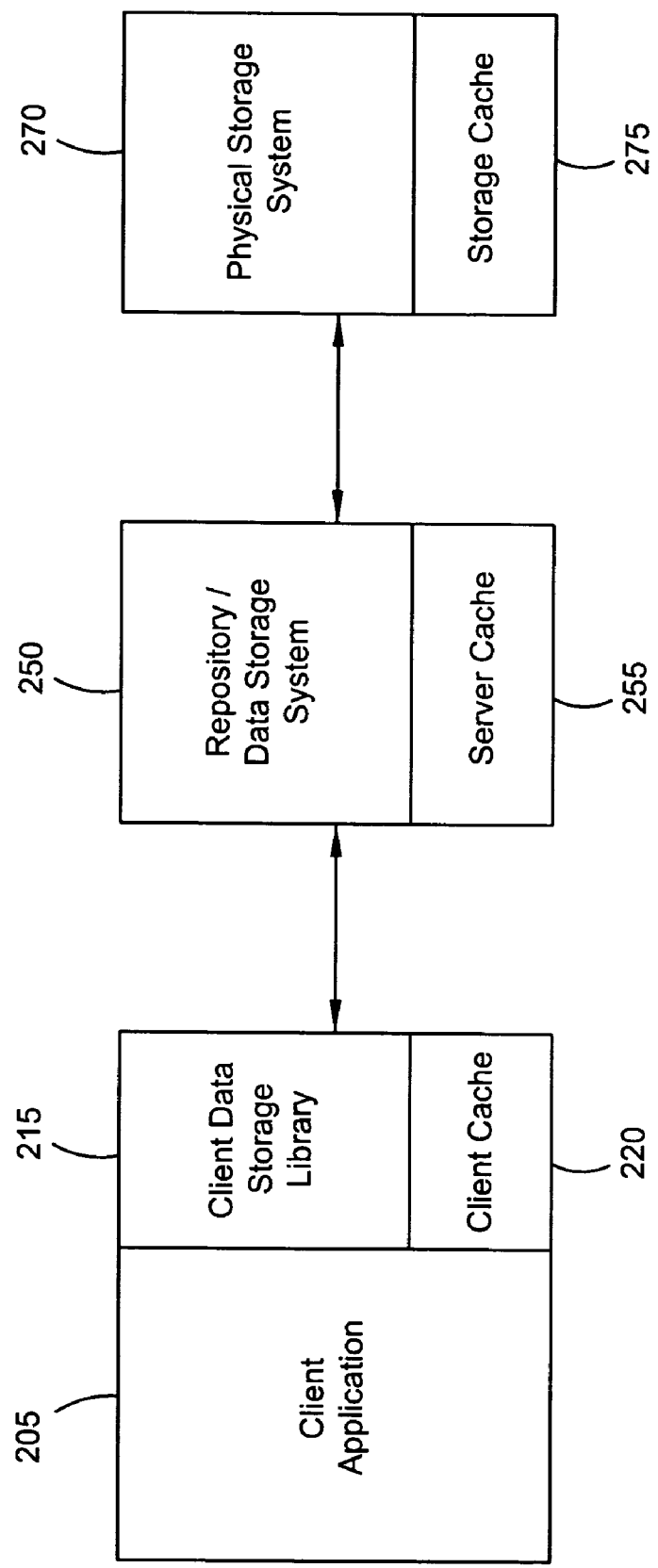
FIG. 2 is a diagram illustrating a system-level overview of an exemplary embodiment of the invention.

The system shown in reference to FIG. 2 has been described in terms of a three-tier architecture operating in a virtual memory environment, as is common and known in the art. However, the invention is not limited to three-tier architectures. For example, the above-described components could also be implemented in a client-server architecture where a data storage engine is provided as a component of an application and accesses a remote physical storage system. Also, the invention can be implemented in a multiple tier architecture having more than three tiers. Additionally, the invention is not limited to virtual memory environments. The terminology used in this application is meant to include all of these environments.

Versioning in an Object Repository

The various embodiments of the invention provide the ability to version objects in an object repository. Versioning captures changes in the state of an object, and enables a user to reconstruct previous, or old, states of an object. In one embodiment of the invention, there are four principle versioning operations that are invoked over the life cycle of an object: CreateObject, FreezeVersion, CreateVersion and MergeVersion. In one embodiment of the invention, these operations are implemented as methods on the object.

The CreateObject operation creates the first version of an object in a repository, and initializes the state of the object. In one embodiment of the invention, the state of the object is "unfrozen." In other words, the properties and relationships defined by the object can be updated.

The FreezeVersion operation places a version in a "frozen" state. When a version is in a frozen state, the objects in the version and the object's properties and states cannot be updated.

The CreateVersion operation creates a new version of an existing object. The newly created object is referred to as the successor. In one embodiment of the invention, an existing object must be in a frozen state before the CreateVersion operation can be invoked on it. Requiring the existing object to be in a frozen state before allowing a new version to be created is desirable, because it allows the repository to use delta storage to store the new version. Delta storage, as is known in the art, is the storage of only those values that differ between an existing object and a successor object.

Multiple invocations of the CreateVersion operation can result in multiple versions of an object existing at the same time. Each of the multiple versions can have changes in one or more of the properties in the object. The MergeVersion operation merges the changes in the multiple versions into a single version of the object. The MergeVersion operation applies various rules to resolve conflicts that can arise as a result of changes to the same property or state in two of the versions to be merged.

Figure 4:
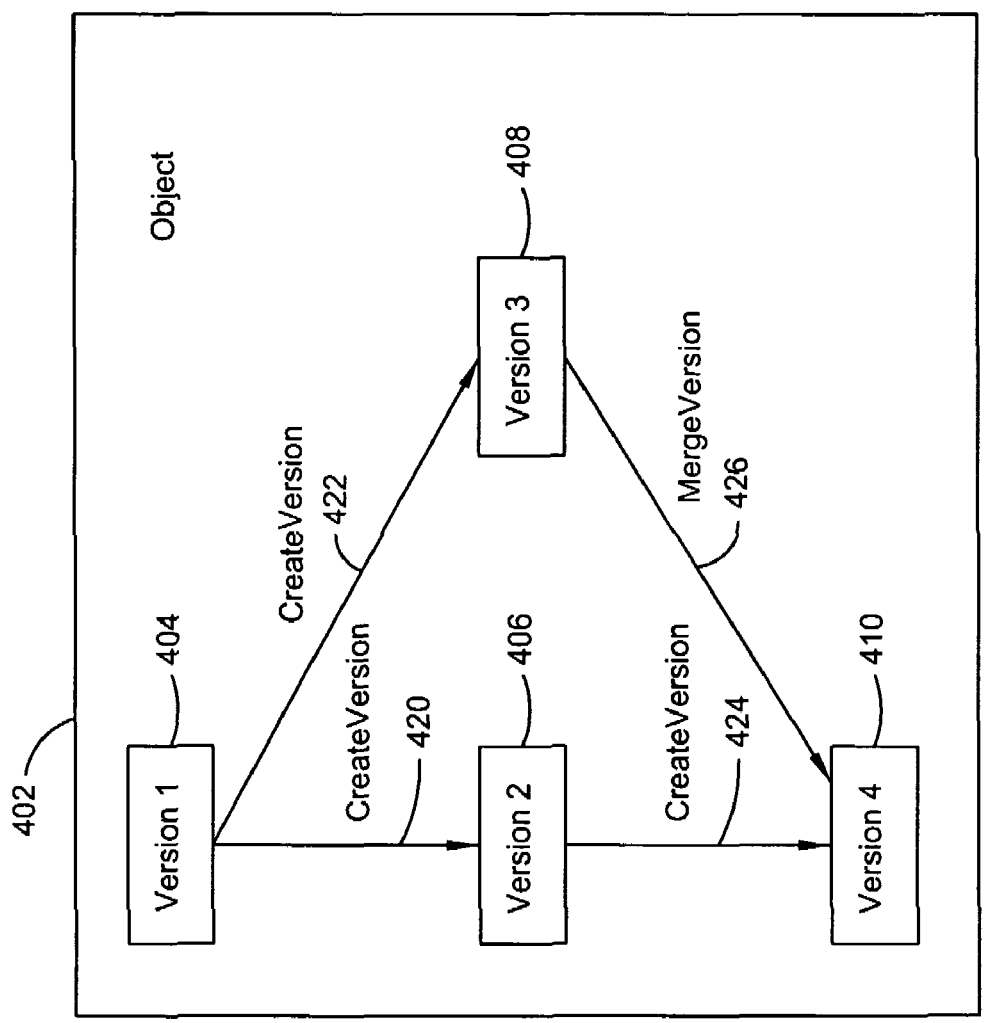
FIG. 4 is a diagram illustrating an exemplary sequence of version creation and version merging.

A version graph illustrating the above-described concepts is shown in FIG. 4. The version graph illustrates an exemplary life cycle of an object 402 as represented by the various versions of the object. Object 402 is created when the CreateObject operation is invoked to create the first version 404 for the object. In one embodiment of the invention, the FreezeVersion operation is invoked on object 402. Next, the CreateVersion operation 420 is invoked to create a second version 406 of the object. This is followed by a second invocation 422 of the CreateVersion operation, resulting in a third version 408 of the object 402.

Then, in an embodiment of the invention supporting the FreezeVersion operation, the second version 406 of the object is placed in a frozen state. Next, a CreateVersion operation 424 is invoked to create a fourth version 410 of the object 402. This is followed by invoking the FreezeVersion operation to place the third version 408 in a frozen state.

Finally, the MergeVersion operation 426 is invoked. This operation merges the changes from the third version 408 and its predecessors into the fourth version 410.

In general, the MergeVersion operation merges two versions of an object O. In one embodiment of the invention, the merge takes place between two versions, a version that is frozen FV, and a version V that is not necessarily frozen. The MergeVersion operation takes two parameters: the frozen version FV of an object O and a flag that identifies either V or FV as primary. The system makes FV a predecessor of V and merges the state of FV into V as follows: first, the system finds a least common ancestor of V and FV, called the basis version, BV, and compares V and FV to BV. The comparison is performed on a property by property and relationship by relationship basis.

In general, conflicts in property values between versions are resolved as follows. For each property P of O, if only one of V or FV has updated P since BV, then the updated value is assigned to P in V. If both V and FV updated P, then the value of the primary is assigned to P in V. Table 3 below provides further details on the property and relationship comparison.

TABLE 3

| Primary Version | Secondary Version | | | |
| --- | --- | --- | --- | --- |
|  | No change | Inserted | Deleted | Updated |
| No change | No change | Insert the secondary item | Delete the item | Use the secondary item |
| Inserted | Insert the primary item | Insert the primary item | Insert the primary item | Insert the primary item |
| Deleted | Delete the item | Delete the item | Delete the item | Delete the item |
| Updated | Use the primary item | Use the primary item | Use the primary item | Use the primary item |

The above described merge process can also be applied to collections. In this case, the rule is applied to the whole collection or to each relationship within the collection. A flag on each collection's type definition drives this choice. For example, if a collection has maximum cardinality 1, then merging the whole collection would be more appropriate. In one embodiment of the invention, if the relationship is a destination relationship collection, no merging is performed. This is desirable because collections are an object-set valued property of the origin object. Elements in such a collection are therefore properties of other objects, i.e. the objects whose origin collection they belong to and not of the current object.

In addition, merges of collections within an object can be performed by picking one entire collection over the other. One case where this is useful is when the two versions to be merged include updates that cannot coexist. For example, suppose there should be only one data type object in the collection, but the two collections to be merged have each inserted a different data type object. In this case, merging item by item would result in the collection having two data type objects, which is nonsense. Instead, only the primary version's collection should be used as the value of the collection. Another example where picking an entire collection is desirable is where the collection cardinality is fixed (e.g. at one), such that merging the collections would violate the cardinality constraints. Flags are provided in order to control the behavior of the merge in these cases.

Although the above semantics of MergeVersion cover many common cases, some applications may prefer another algorithm for merging state. In one embodiment of the invention, where the repository is Microsoft® Repository™, a user can override the merge algorithm for a class in a wrapper, using COM aggregation. COM aggregation is known in the art. In order to support customization of the MergeVersion operation, it is desirable that the merged object be left in an unfrozen state. This allows tools to interact with users to customize the merge algorithm results on an object by object basis.

As described above, the merge process merges two versions of an object at a time. Multi-way merges are accomplished by repeatedly merging two versions at a time.

Figure 5A:
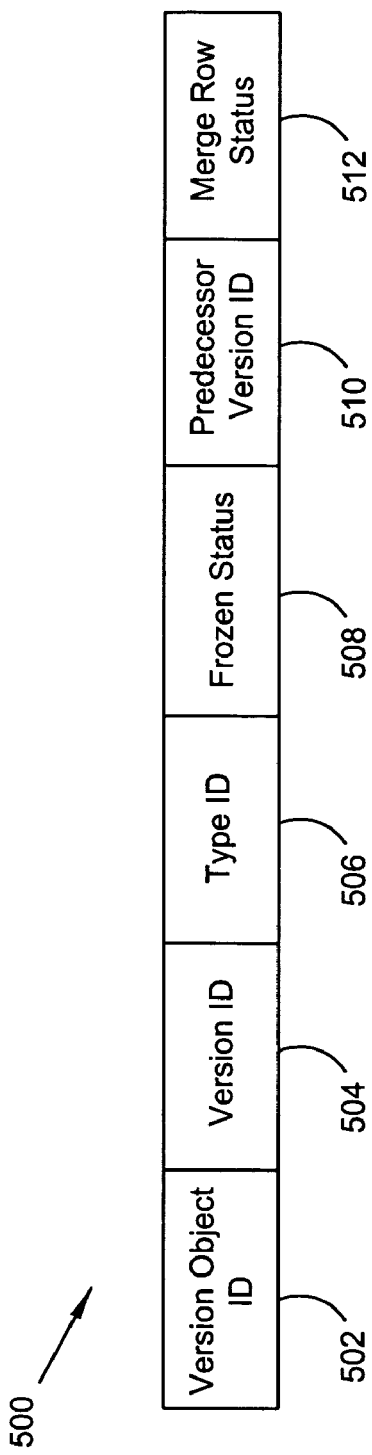
FIGS. 5A and 5B are diagrams illustrating data structures supporting object versioning according to an embodiment of the invention.
Figure 5B:
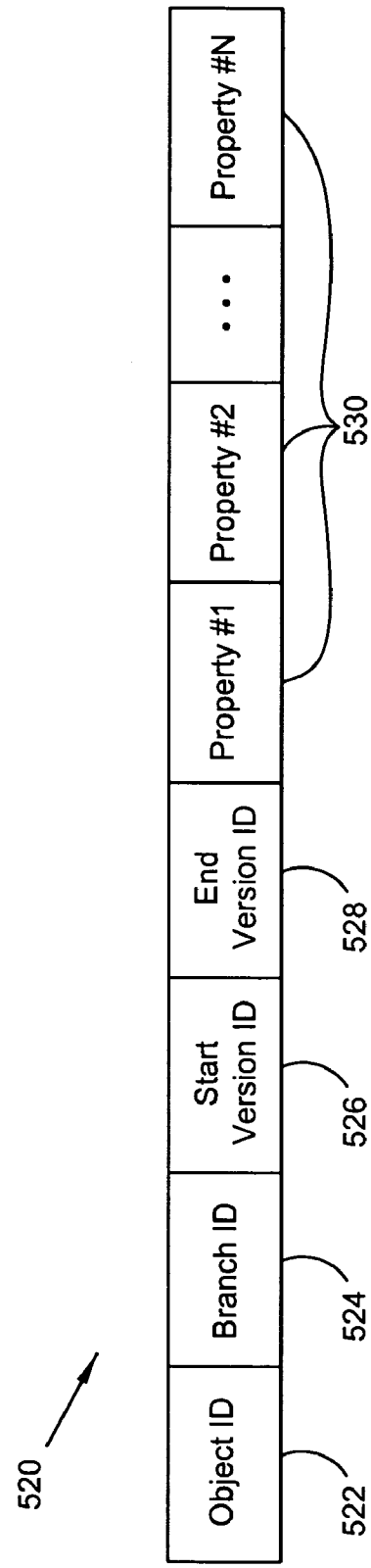

In one embodiment of the invention, two tables, a version table and a properties table are included in the data structures that support the versioning operations described above. FIGS. 5A and 5B provide a description of these tables. In FIG. 5A, the fields included in an exemplary version table 500 are described. The fields include a version object id 502, a version id 504, a type id 506, a frozen status 508, a predecessor version id 510, and a merge row status 512.

The version object id 502 is a unique identifier that identifies the set of rows in the version table that represent all the versions of the object.

The version ID 504 is a unique identifier that identifies the row in the table that represents a particular version of the object.

The type ID 506 identifies the class corresponding to the version.

The frozen status field 508 indicates whether the version is in a frozen state or not. As noted above, a version that is frozen cannot have its properties and states updated, while a version that is not frozen can be updated.

The predecessor version ID 510 identifies the version that is the immediate predecessor version of the version represented by the row in the version table. The predecessor version will be the version that serves as the source for property and state values for the current version.

In one embodiment of the invention, the version table includes a merge row status field 512. This field is used to indicate that the version is a predecessor version that exists due to the execution of a MergeVersion operation.

A diagram of an exemplary property table data structure according to an embodiment of the invention is shown in FIG. 5B. The exemplary property includes an object ID field 522, a branch ID field 524, a start version ID 526, an end version ID 528, and at least one property 530.

The object ID field 522 is a unique identifier for the row in the property table.

The branch ID field 524 is an identifier that uniquely identifies a branch within a particular version. A branch is formed when a new successor object is created from a predecessor object that already has at least one other successor object.

Start version ID 526 and end version ID 528 define a range of versions for which the properties 530 of the object defined by row 520 have the same values.

Figure 6:
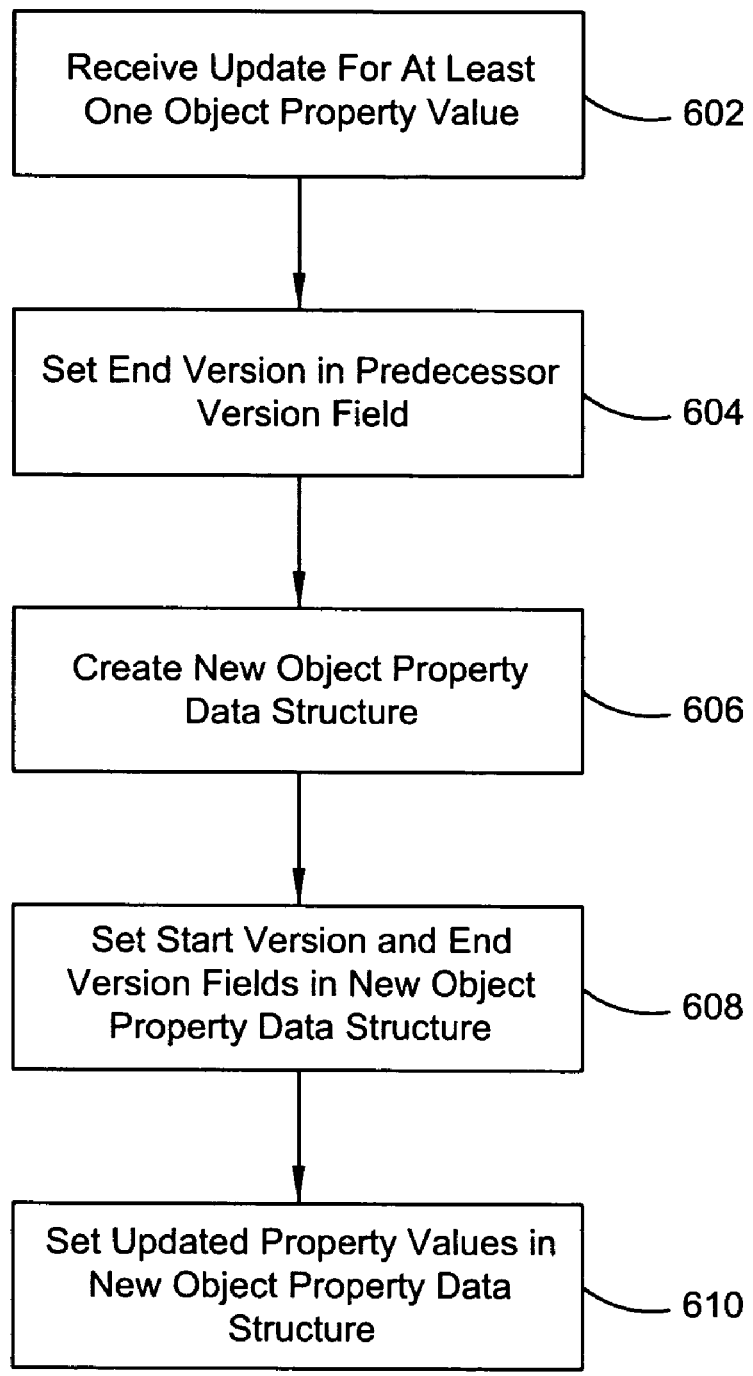
FIG. 6 is a flowchart illustrating a method for updating a property in a versioned object according to an embodiment of the invention.

A method 600 for maintaining multiple versions of an object is shown in FIG. 6. The method begins when a program executing the method, such as a repository server, receives an update for at least one property value in a versioned object (block 602). Upon receiving the property update, the program sets an end version field in an object property data structure to a value representing an immediate predecessor version (block 604). In one embodiment of the invention, the data structure is a row of a property table in a database. The data structure now represents the predecessor version of the object.

Next, the program creates a new object property data structure to represent the successor version of the object (block 606). After creating the new object data structure, the program sets the start version field and the end version field in the object property data structure representing the successor object (block 608). The start version field is set to a version identifier representing the successor version, and the end version identifier is set to infinity. However, in alternative embodiments of the invention, a value other than infinity can be used. For example, the end version identifier can be the version identifier for the most current version.

Finally, the program sets the property value fields in the successor object to the updated value (block 610).

The operation of method 600 is further illustrated using Table 1 and Table 2 below. The tables represent an exemplary object property table of an object repository. The objects represented in the tables have two properties, P and Q. Table 1 represents the state of the system before any values of P or Q have been updated. In this state, the values for P and Q are the same as when the object represented by the row in the table was first created. In this state, P has a value of "A", and Q has a value of 1 (one). By way of example and not of limitation, assume that the current version of the object is [17,0,3] as indicated by the key formed by the Object ID, Branch ID and Version ID, and that the predecessor version is [17,0,2]. Thus, in the exemplary state represented in Table 1, P and Q have had the same values from the initial creation of the object (version [17,0,0]) through the creation of three successor versions ([17,0,1], [17,0,2] and [17,0,3]).

TABLE 1

| Object ID | Branch ID | Start-Version ID | End-Version ID | P | Q |
|---|---|---|---|---|---|
| 17 | 0 | 0 | ∞ | "A" | 1 |

Table 2 below represents the state of the versions of the exemplary object after the operation of the method illustrated in FIG. 6 has been applied to the object. In the example, the value for property P has been updated to "B". As a result of the update, the property table is split into two rows. The first row represents the versions of the object prior to the update, that is versions [17, 0, 0] through versions [17, 0, 2]. The second row represents versions of the object after the update, that is versions [17, 0, 3] and above.

TABLE 2

| Object ID | Branch ID | Start-Version ID | End-Version ID | P | Q |
|---|---|---|---|---|---|
| 17 | 0 | 0 | 2 | "A" | 1 |
| 17 | 0 | 3 | ∞ | "B" | 1 |

It should be noted that in one embodiment of the invention, predecessor versions of the updated object must be frozen before the application of method 600. In this embodiment, version [17, 0, 2] from the example illustrated above would have to be frozen, while version [17, 0, 3] would have to be unfrozen.

Figure 7:
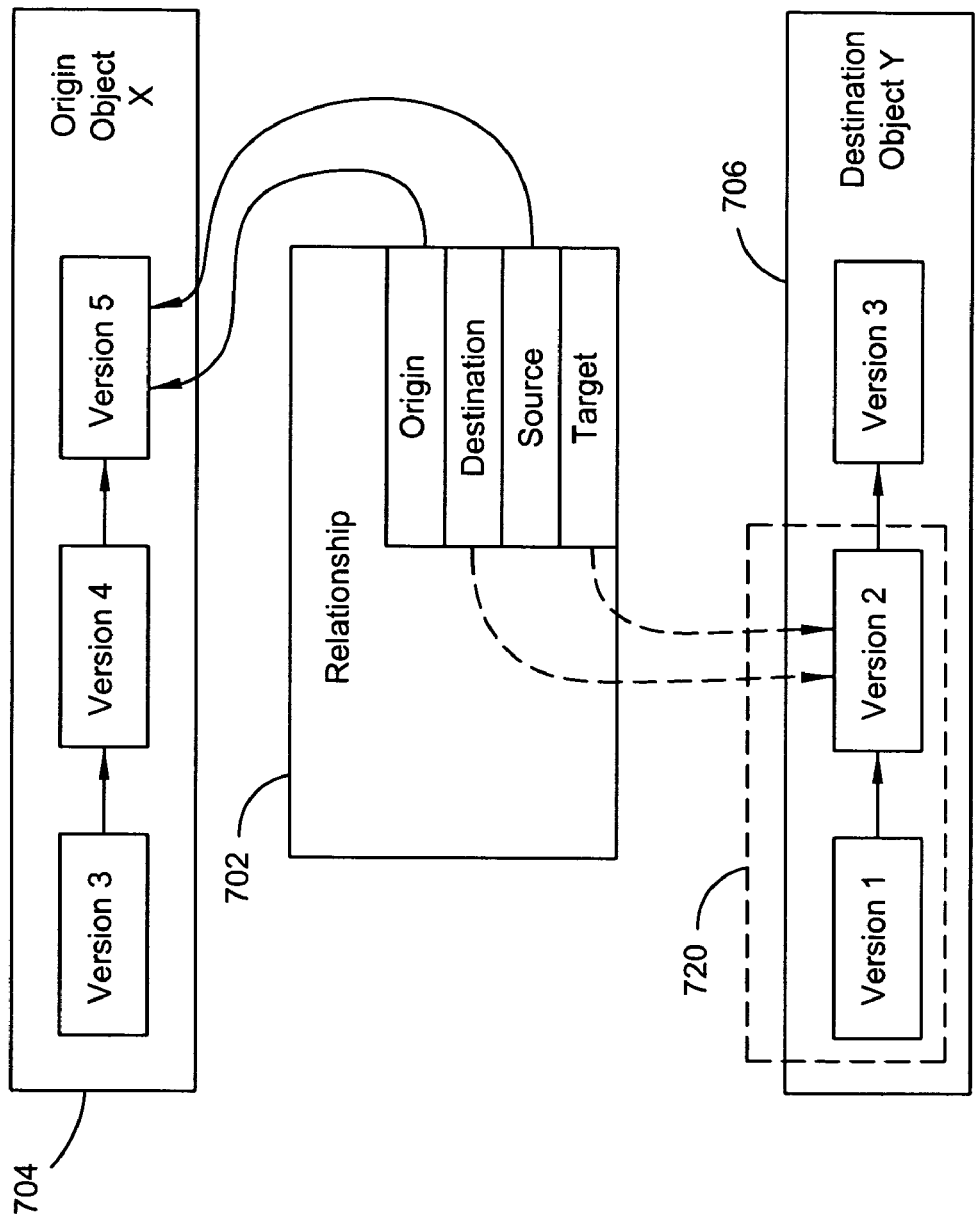
FIG. 7 is a diagram illustrating an exemplary object relationship.

In addition to having properties, objects can be part of a relationship. A diagrammatic representation of a relationship according to an embodiment of the invention is shown in FIG. 7. As shown, the relationship 702 is a bi-directional connection between two repository objects, an origin object 704 and a destination object 706. Each relationship has a type, which in turn identifies the type of origin and destination objects on each side of the relationship.

The act of navigating from an object on one side of a relationship to an object on the other side of a relationship is known in the art as traversing. When traversing a relationship, one starts at a known object referred to as the source object, and traverses to an object referred to as a target object. Whether an object is a source or a target object depends on the direction of the traversal. Since connections are bi-directional, an object can be both a source and a target object at different times, depending on the direction of the traversal.

Like properties, relationships can also be versioned. Usually a new object version will want to participate in the same origin relationships as its predecessor. In this case, a relationship is 'propagated' to the immediate successors of a origin version, just as a property value is 'propagated' to a version's immediate successors. Just as with properties, those successors are free to make whatever changes they want.

For some relationship types, propagating relationships is inappropriate. For example, consider an object model in which object types represent relationships between computer program source code files and executable files. In this model, there are relationships between a source code file and "include" files, and also relationships between the source code and the executable produced as a result of compiling the source code. In this case, creating a new version of the source code should preserve the relationship with the include files, as it is likely that the new version of the source code will still need the definitions provided by the include file. However, it is unlikely that the new version of the source code should have a relationship with the previous version of the executable file, because the source code needs to be recompiled to produce a new executable. In this case, the relationship should not be propagated.

In one embodiment of the invention, all relationships are stored in a single relationship table. The table definition is similar to the property table illustrated in FIG. 5B. The main columns of the relationship table are an origin version range (i.e. [Object id, Branch id, Start-version id, End-version id]), a destination version, and a relationship type.

When executing CreateVersion on version V of an object, thereby creating version V', the repository engine ordinarily copies V's origin relationships to V'. However, the copying can be turned off by setting a flag on each relationship type definition. If V and V' are on the same branch and if the end-version id is infinity for V's origin relationships, as is usually the case, then the relationship table need not be updated to cause the relationship to be copied. A new row of the relationship table must be inserted when a new branch is created. A new row is also needed when, for a given origin version, V, a new destination version DV is added. In an alternative embodiment of the invention, the destination version identification field is stored as a range similar to the origin range. In this embodiment, when DV is on the same branch as other destinations of V, no additional row in the relationship table is required, rather the destination version range is updated.

As noted above, whether or not to propagate a relationship is controlled by flags on the relationship object. In one embodiment of the invention, a collection definition flag controls relationship copy on the origin side. That is, the flag controls whether the new version 'copies' relationships from its predecessor. The default is that the relationships are inherited. In an alternative embodiment of the invention where COM objects are stored in the repository, the repository data model provides a definition-time option on the flags ICollectionDef::Flags::COLLECTION_NEWVERSIONSPARTICIPATE to allow information model designers to choose the appropriate propagation behavior for each relationship type. The default behavior is that origin relationships are inherited.

Figure 8:
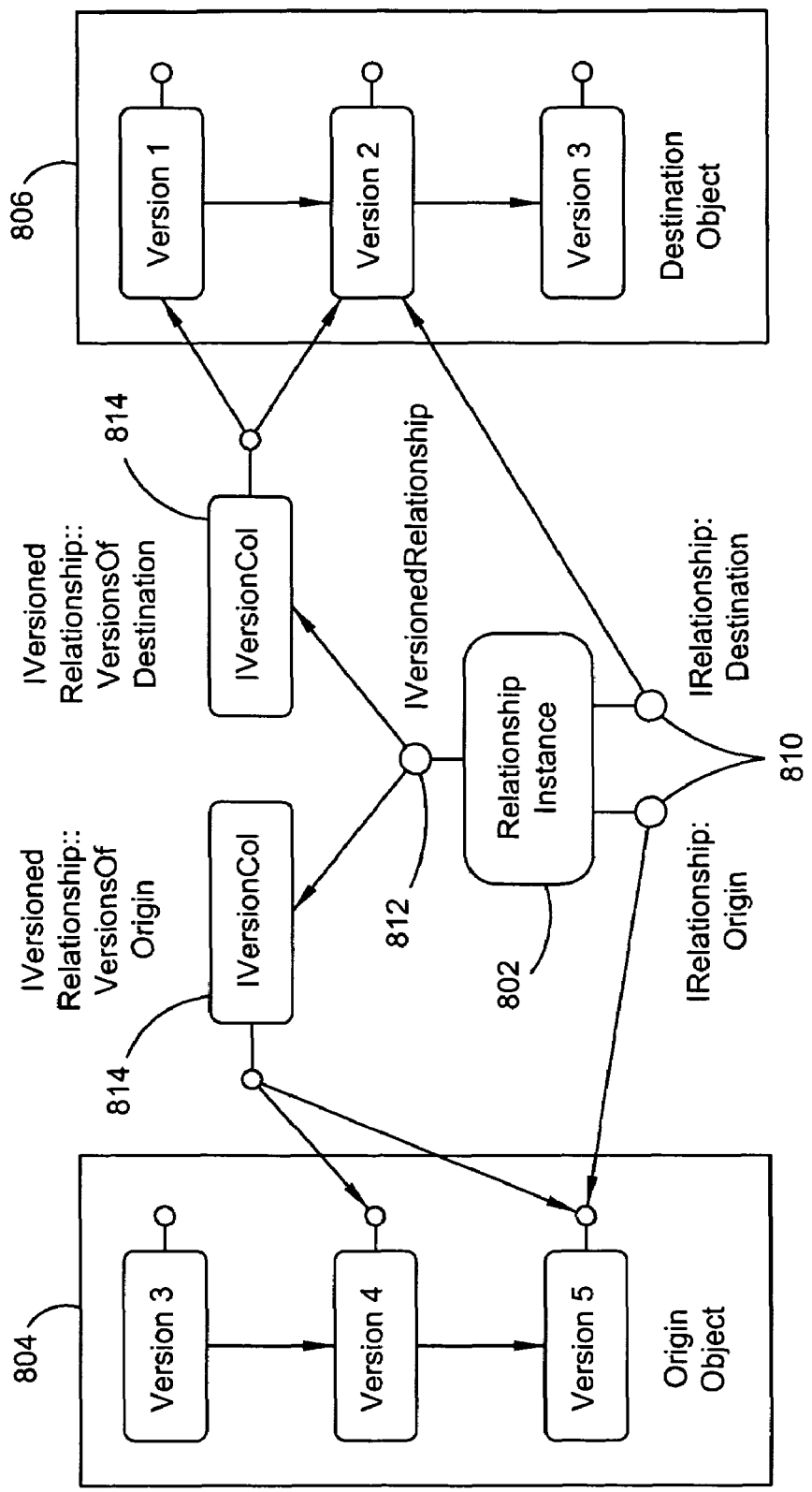
FIG. 8 is a diagram illustrating interfaces for traversing relationships in version-aware and non-version-aware applications according to an embodiment of the invention.

A further aspect of the invention is the ability to support relationships between versioned objects for both version-aware applications, and applications that are not version-aware. FIG. 8 illustrates an exemplary embodiment of the invention that supports multiple interfaces. One set of interfaces provides the ability for version-aware applications to access multiple versions of an object, while a second set of interfaces provides the ability for applications that are not version-aware to access objects, even though the objects themselves are versioned. As shown in FIG. 8, origin object 804 has a relationship with destination object 806 as defined by relationship object 802. In addition, there are three versions of origin object 804: versions 3, 4 and 5, and three versions of destination object 806: versions 1, 2 and 3. As illustrated by the shading of the objects, the current state of the relationship is that version 5 of origin object 804 is related to version 2 of destination object 806.

Relationship object 802 provides two sets of interfaces to access the origin and destination objects, a version-aware interface set 812 and a non-version-aware interface set 810. In an embodiment of the invention in which the repository is the Microsoft Repository, the version-aware interface set 812 is the IVersionedRelationship interface, and the non-version-aware interface set is the IRelationship interface.

When a version-aware application uses the version-aware interface set 812, collection objects 814 comprise the set of versioned objects returned by the interface in the origin and destination objects. In the exemplary scenario illustrated in FIG. 8, when a version-aware application retrieves the origin object 804, versions 4 and 5 are returned in a version collection 814. Similarly, when a version-aware application retrieves the destination object 806, versions 1 and 2 are returned in a version collection 814. The version-aware application can then programmatically determine the actions to be performed related to the versioned objects.

When an application that is not version-aware uses the non-version-aware interface set 810, objects must be resolved to a particular version and only single versions of origin and destination objects are returned. In the exemplary scenario illustrated in FIG. 8, invoking the version-independent interface 810 returns version 5 of object 804, and version 2 of destination object 806. The choice of a particular version of an object to return can be determined by several factors. In one embodiment of the invention, the non-version-aware interface returns the version of an object that currently exists in a workspace allocated by an application. The operation and effect of workspaces in a versioned object environment is described in detail in the following section.

In an alternative embodiment of the invention, the latest version of a target object that is related to a source object is returned. In this embodiment, the resolution is to the most recently created version of the target object that participates in the relationship. Other newer versions might also exist that do not participate in the relationship, for example version 3 of destination object 806.

In a further alternative embodiment of the invention, a pinned version of a target object that is related to a source object is returned. A pinned object is a particular version of an object that has been specified as the default destination object in a relationship.

Workspaces in an Object Repository

The previous section described versioning of objects in an object repository. This section will describe embodiments of the invention that support workspaces within a repository that can be used to support working with versioned objects.

A system level overview of an embodiment of the invention supporting repository workspaces is shown in FIG. 9. The system includes a repository 250, one or more workspaces 908, a version aware application 902, and a non-version-aware application 904. Repository 250 is described in detail above with reference to FIG. 2, and by way of example includes repository objects 906. The objects 906 are versions 1-3 of an object X, and version 1 of an object Y.

Each of workspaces 908 is a logical repository session. However, unlike an ordinary repository session, a workspace is persistent. In other words, workspaces exist across repository sessions.

Versions of repository objects can be explicitly added to a workspace, thereby making them visible in the workspace. In the exemplary system shown, workspace #1 contains version 1 of object X, workspace #2 also contains versions 1 of object X, and workspace #3 contains version 3 of object X and version 1 of object Y. Objects can also be explicitly removed from the workspace. A version can be added to many workspaces. However, there can be at most one version of an object in each workspace. Thus, a workspace is a single-version view of a subset of the repository database.

Version-aware application 902 is an application that has been designed to take advantage of the versioning capability provided by repository 250. Version-aware application 902 establishes a session S with repository 250. In one embodiment of the invention where the repository is Microsoft Repository, application 902 accesses the repository via an IRepository2 interface. The IRepository2 interface supports versioning. After a session S has been opened, the application's context includes the entire repository. The application can then access a workspace W in S. In the example shown, application 902 has established a connection with workspace #1, using an IWorkSpace interface. Workspaces 908 support the session interfaces, so a client can use a workspace as a logical, or virtual, repository session. Thus, a workspace can be viewed as a wrapper for the base repository which provides a context and filter mechanism. Operations on workspaces are delegated to the base repository object, with appropriate filtering applied to a subset of the object and relationship versions present in the workspace 908.

By executing operations in the context of a workspace instead of S, the client only sees objects that are in (i.e. were added to) the workspace, relationships on such objects, and those relationships' target objects that are also in the workspace. However, if required, the application can use S instead of W to access the entire repository.

An object (i.e., version) in a workspace can be updated only after it is checked out. It can be checked out to at most one workspace at a time. The checkout/checkin methods amount to long-term locks that are stored in the repository database and are used to implement long transactions. A typical long transaction would add some versions to a workspace, check out the ones to modify, perform updates (under short transaction control), check them back in, and optionally freeze them. This has the benefit of controlling and managing changes to objects in the repository.

Non-version-aware application 904 is an application that has been designed such that it is not capable of recognizing multiple versions of an object. The application 904 may be one that was designed to access a repository before versioning capability was added, or it can be an application that does not require versioning, but wants to access objects in a repository containing versioned objects. In an embodiment of the invention where the repository is Microsoft Repository, the non-version-aware application is designed to use the IRepository interface. This interface does not support versioning in the repository.

In the example shown, non-version-aware application 904 has established a connection to workspace #3. The non-version-aware application 904 accesses (non-versioned) objects using a repository session as its context. The application 904 can still use session interfaces on those workspace objects, so no other changes to the application 904 are required. The resulting application only accesses those objects that are in the workspace.

Thus, the workspace's support of session interfaces provides the backwards compatibility necessary for non-version-aware applications such as application 904. This provides a way for non-version-aware applications to gain the benefits of long term locking provided by workspaces by opening a workspace. In addition, the workspace interface can be modified to add major new functionality (workspace scoping) while avoiding the major change in the programming model that would otherwise be necessary to set and reset scope.

After establishing a workspace connection, applications such as applications 902 and 904 can add versions to a workspace. In an embodiment of the invention where the repository is the Microsoft Repository, versions are added to a workspace using the IWorkspace.Contents.Add method. As noted above, a workspace includes a single version of each object. If a version of an object already present is included in the workspace, the newly included version replaces the previously included version in the workspace.

In addition, object versions can be removed from a workspace. In an embodiment of the invention where the repository is Microsoft Repository, objects are removed using the IWorkspace.Contents.Remove method. It is desirable that a version cannot be removed from a workspace while it is checked out to that workspace.

Each version in a repository maintains a context pointer. This context pointer indicates whether or not the version object is associated with a workspace or workspaces, and if so, which workspaces. The context pointer simplifies the addition of objects to a workspace, and also allows an application to copy or compare an object between workspaces, or between a workspace and the repository. The first advantage of an implicit context pointer is the simplification of the API (Application Programming Interface) for programs that manipulate versions vs. requiring the program had to explicitly specify workspace context on every object reference. The ability to add objects to workspaces, compare objects in workspaces and/or the repository, copy objects between workspaces and/or the repository etc. is more in the nature of a requirement for the API. By having separate running object instances, each with its own context, the system disambiguates cases where the same version of an object must be manipulated in multiple contexts simultaneously. As with other functionality, while it would be possible to design an API with explicit context; it would be less convenient to use. Further, by having workspaces support most of the same interfaces as the repository session object, programs written to the non-versioned API will work against workspaces with no code changes

CONCLUSION

Maintaining versions and workspaces in an object has been described. As those of skill in the art will appreciate, the embodiments of the invention provide advantages not found in previous systems. For example, there is no need to copy objects as new versions of an object are created. The new versions are included in the range defined by the start version and end version identifiers. It is only when a property is actually updated that the property table representing the objects must be updated. Thus the embodiments of the invention make more efficient use of both memory and processor resources than previous systems.

Furthermore, the embodiments of the invention operate with both version-aware and non-version-aware applications.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while maintaining versions and workspaces has been described in terms of an object database or repository, other means of storing persistent objects can be readily substituted. In addition, the embodiments of the invention have been described in terms of maintaining versions and workspaces associated with objects. However, the systems and methods described can be applied to any data entity serving a similar purpose to objects in an object-oriented environment. The terminology used in this application is meant to include all of these environments. Therefore, it is manifestly intended that this invention be limited only by the following claims and equivalents thereof.

We claim:

1. A computerized system for maintaining a repository comprising:
    an object stored within the repository, the object having a version, the version having a context pointer and a relationship comprising a bi-directional connection between the repository object and a second repository object, and a relationship type;
    a workspace within the repository, said workspace operative to hold a version of the object and an object relationship in the repository; and
    wherein the context pointer of the version of the object is set to the workspace holding the version of the object and a version of the object relationship when the version of the object is in the workspace, facilitating addition of objects to the workspace, and allowing an application to copy or compare an object and the object relationship between workspaces, or between a workspace and the repository, and wherein the version is updated by copying only updated properties and associated version identifiers and not the updated object, and
    wherein each object instance has its own context pointer and a pointer to the object relationship instance to disambiguate cases where a same object version is manipulated in multiple contexts simultaneously, and wherein an interface may support bi-directional relationships between versioned objects for both version-aware applications, and applications that are not version-aware.

2. The computerized system of claim 1, wherein the context pointer of the version of the object is set to the repository when the version of the object is not in a workspace.

3. The computerized system of claim 1, wherein said workspace is operative to hold only one version of the object in the repository at a time for either a version-aware application, or a non-version aware application.

4. The computerized system of claim 1, wherein the object can be updated only after being checked out of the repository, and wherein a respective object can only be checked out to one workspace at a time.

* * * * *